Patented Jan. 19, 1943

2,309,071

UNITED STATES PATENT OFFICE 2,309,071

BLACK GLASS AND METHOD OF MAKING THE SAME

John D. Sullivan and Chester R. Austin, Columbus, Ohio, assignors to Battelle Memorial Institute, Columbus, Ohio, a corporation of Ohio No Drawing. Application March 21, 1941, Serial No. 384,585

9 Claims. (Cl. 106—52)

Our invention relates to black glass and method of making the same. It relates, more particularly, to a black glass for use in architectural decoration, structural applications, table ware, containers and novelty articles.

Black glasses have long been known in the art. The base material for such glasses has usually been a soda-lime-silica glass to which various colorants have been added. One of the more common colorants has been iron sulfide, sometimes added to the glass batch as pyrites. Iron oxides and compounds which form oxides on heating have also been used as black colorants. Manganese and iron, and nickel and cobalt, have also been used to make black glass.

It has been necessary to use these prior art colorants in relatively large amounts to secure sufficient color absorption in the product to give a black glass, 10 to 15 per cent or more being common additions. Such high amounts of colorant additions are quite detrimental to the physical and mechanical properties of the glass. Because of these additions, the structural strength of the glass is decreased and the glass becomes softer and less resistant to abrasion. Some black glasses, which are made with iron sulfide, give a brown scratch or streak.

Because of these adverse defects of the colorant additions of the prior art, there has long been a demand for a black glass in which the colorant additions are low and which has the physical and mechanical properties of uncolored glass.

One of the objects of our invention is to provide a glass which is made by adding only a relatively small amount of colorant to a batch to yield a glass which is black as viewed in transmitted or reflected light.

Another object of our invention is to provide a black glass of the type referred to in the preceding paragraph which will have the physical and mechanical properties of uncolored glass.

Another object of our invention is to provide a glass of the type indicated having superior blackness so that it will be possible to use it in thinner sections than prior art glasses and yet obtain a black appearance in either reflected or transmitted light.

A further object of our invention is to produce a black glass which is more easily melted and fined than prior art black glasses because the amount of colorant additions is small.

The black glasses of our invention are produced by adding small amounts of selenium, and at least one of the elements selected from the group consisting of cobalt, nickel and iron, to a glass batch. The preferred element of the group is cobalt. The cobalt, nickel or iron may be added in the metallic form, but it is preferably added in the form of metal compounds. Among these metal compounds, the metal oxides and materials which form oxides on heating, have been found to be very suitable for the purposes of this invention.

It will be understood that most glasses contain very minor amounts of iron, usually in the range 0.02–0.03 per cent of $Fe_2O_3$, by reason of its occurrence as an impurity in the materials used in the batch. This low amount is ineffective to produce the results of this invention and is not included in the claims of this application. For the purpose of this invention, iron in more than the amounts ordinarily termed "residual" is required.

The black glasses of this invention are prepared by mixing selenium and the selected metal (cobalt, nickel or iron), or its compound, in minor amounts with a selected glass batch. Examples of black glass batches which have been prepared according to this invention are listed in Table I. The base glass batches are given in Table II.

TABLE I.—*Black glass batches*

| Base glass batch | Ni, Co, Fe addition to batch | | Selenium addition, to batch, per cent | Other additions to batch, per cent | Selenium in final melt, per cent | Atmosphere |
|---|---|---|---|---|---|---|
| | Material | Per cent | | | | |
| B | $CoCO_3$ | 0.1 | 0.6 | | | Reducing. |
| A | do | 0.1 | 0.6 | | 0.18 | Do. |
| D | do | 0.1 | 0.6 | | | Do. |
| A | do | 0.1 | 0.4 | 0.5 C | | Oxidizing. |
| A | do | 0.1 | 0.2 | 0.5 C | | Do. |
| A | do | 0.1 | 0.4 | | | Reducing. |
| A | do | 0.1 | 0.4 | 0.3 NiO | | Do. |
| A | do | 0.1 | 0.4 | 0.1 NiO | | Do. |
| A | NiO | 0.8 | 0.6 | | 0.04 | Do. |
| B | $Ni_2O_3$ | 0.3 | 0.6 | | | Do. |
| B | do | 0.3 | 0.4 | | | Do. |
| A | NiO | 0.1 | 0.6 | | 0.22 | Do. |
| B | $Fe_2O_3$ | 0.3 | 0.6 | | | Do. |
| B | do | 0.2 | 0.4 | | | Do. |
| A | do | 0.1 | 0.6 | | 0.23 | Do. |
| A | do | 0.1 | 0.0 | | 0.24 | Do. |
| A | $FeC_2O_4 \cdot 2H_2O$ | 0.1 | 0.6 | 0.2 C | 0.30 | Do. |
| A | Fe | 0.1 | 0.6 | | 0.22 | Do. |
| A | do | 0.5 | 0.6 | | 0.20 | Do. |

The base glass batches to which the colorants of our invention were added had the following compositions:

TABLE II.—*Base glass batches*

| Ingredient, per cent | A | B | D |
|---|---|---|---|
| $SiO_2$ | 72.5 | 74.3 | 72.5 |
| $Na_2O$ | 12.5 | 12.8 | 15.0 |
| $K_2O$ | 1.5 | 0.6 | 1.5 |
| $Al_2O_3$ | 2.5 | 1.0 | 2.5 |
| CaO | 6.6 | 6.8 | 8.5 |
| MgO | 4.4 | 4.5 | |

While these particular compositions are listed it should be understood that many other silicabase glasses are suitable for the practice of this invention.

The amount of selenium to be added, according to our invention, is dependent on the melting conditions used for the batch. Oxidizing conditions are, in general, detrimental to the development of the black glass since these conditions cause the selenium to be driven from the batch, and if oxidizing conditions are used, large amounts of selenium must be added. Ordinarily, reducing conditions are maintained by using an atmosphere above the glass batch which has no free oxygen and which contains about 1 to 5 per cent of carbon monoxide. Reducing conditions may be maintained in the glass melt, however, even when it is melted in an oxidizing atmosphere by adding or including a reducing agent in the batch. Carbon, sugar, tartaric acid, sodium cyanide, and other carbon-containing materials are suitable reducing agents for use. Other reducing agents known to the art may also be used.

The real criterion for the amount of selenium to be used is the retention of the selenium in the finished glass. We have found that as little as 0.04 per cent of selenium in the final batch, in conjunction with cobalt, nickel, or iron, is sufficient to produce a black glass. To obtain this amount of selenium in the final batch, at least 0.04 per cent of selenium must be added to the original charge and, in general, because of volatilization losses, much larger amounts must be added. The maximum amount of selenium to be used is limited only by the ability of the glass batch to take up selenium, and by economic considerations.

The amount of cobalt, nickel or iron (either as elemental metal or as a metal compound) to be added to the batch is quite small. In many cases, 0.1 per cent has been found sufficient although even smaller amounts may be used in some cases. As in the case of selenium, there is no upper limit on the amount of these metals which may be used, other than the physical and the economic limitations.

When the proper mix is prepared for producing these black glasses, the batch is melted, fined and formed by blowing, pressing, a combination of casting and rolling or pressing, or other methods known to those skilled in the art. The melting and forming techniques are those now known to the art with special care being taken to see that melting occurs under reducing conditions, either by using a reducing atmosphere around the melt or by including reducing agents in the batch if an oxidizing firing atmosphere is used.

The black glasses of this invention have a true black appearance and are free of the purple cast frequently noted when manganese is used to produce a black glass. The black glasses of this invention are applicable for structural uses, such as building facings, etc., for interior decoration, and for other uses which have previously been mentioned. These black glasses are readily reproducible, when melting conditions are properly controlled, and no special thermal treatment is required to develop the black color.

Examination of the black glass of our invention with a spectrophotometer has shown that, in equal thickness, it is much superior in light absorption characteristics to black glass now commercially available. In one test, a glass of our invention was compared, at the same thickness, with a commercial black glass. The maximum amount of light transmitted by the black selenium glass was at a wavelength of 750 millimicrons. At this wavelength, 27 per cent of the light falling on the glass was transmitted through the glass. This maximum amount of 27 per cent was less than the minimum amount of light transmitted by the commercial black glass at any wavelength in the visible range. It is thus apparent that the light absorbing properties of this selenium black glass are excellent when compared with prior art glass.

It will be apparent from the above description that we have provided a black glass having improved light-absorbing properties. The glass can be made by the use of a relatively small amount of colorants and, therefore, it will have the physical and mechanical properties of uncolored glass. Because of the superior blackness of a glass made according to our invention, it is possible to use it in thinner sections than with prior art glasses and still obtain a black appearance. Also, because of the smaller color additions, the glass may be more easily melted and fined.

Various other advantages will be apparent.

Having thus described our invention, what we claim is:

1. A batch composition for producing a black glass having a soda-lime-silica base, said batch composition containing at least 0.04 per cent of selenium, at least 0.1 per cent of a substance selected from the group consisting of cobalt, nickel, iron and their compounds, and a reducing agent.

2. A black glass having a soda-lime-silica base containing at least 0.04 per cent of selenium and about 0.05 per cent of cobalt.

3. A black glass containing in its chemical composition at least 0.04 per cent of selenium and at least 0.05 per cent of a substance selected from the group consisting of cobalt, nickel and iron, said glass having a soda-lime-silica base.

4. A black glass containing in its chemical composition at least 0.18 per cent of selenium and about 0.05 per cent of cobalt, said glass having a soda-lime-silica base.

5. A black glass containing in its chemical composition at least 0.04 per cent of selenium and at least 0.1 per cent of a substance selected from the group consisting of cobalt, nickel and iron, said glass having a soda-lime-silica base.

6. A black glass containing in its chemical composition selenium in amounts in excess of 0.04 per cent and a substance, in effective amount, selected from the group consisting of cobalt, nickel and iron, said glass having a soda-lime-silica base.

7. The method of preparing a black glass having a soda-lime-silica base which comprises melting and fining a glass batch, and forming the molten glass into the desired shape, said batch containing at least 0.1 per cent of a substance selected from the group consisting of cobalt, nickel, iron and their compounds, and containing sufficient selenium so that the final glass contains at least 0.04 per cent of selenium.

8. A method according to claim 7 wherein the batch contains a reducing agent.

9. A method according to claim 7 wherein the batch is melted under a reducing atmosphere.

JOHN D. SULLIVAN.
CHESTER R. AUSTIN.